US010188049B1

(12) United States Patent
Emanuel

(10) Patent No.: US 10,188,049 B1
(45) Date of Patent: Jan. 29, 2019

(54) CUSTOMIZED CROP MODELING

(71) Applicant: CropMetrics LLC, North Bend, NE (US)

(72) Inventor: Nick Emanuel, North Bend, NE (US)

(73) Assignee: CropMetrics LLC, North Bend, NE (US)

(*) Notice: Subject to any disclaimer, the term of this patent is extended or adjusted under 35 U.S.C. 154(b) by 222 days.

(21) Appl. No.: 14/959,986

(22) Filed: Dec. 4, 2015

Related U.S. Application Data

(63) Continuation-in-part of application No. 14/496,141, filed on Sep. 25, 2014, which is a continuation-in-part of application No. 12/584,622, filed on Sep. 9, 2009, which is a continuation-in-part of application No. 12/221,752, filed on Aug. 6, 2008, now abandoned.

(51) Int. Cl.
A01G 25/16 (2006.01)
G05B 13/04 (2006.01)

(52) U.S. Cl.
CPC .......... A01G 25/16 (2013.01); G05B 13/048 (2013.01)

(58) Field of Classification Search
CPC ............................. A01G 25/16; G05B 13/048
See application file for complete search history.

(56) References Cited

U.S. PATENT DOCUMENTS

| | | | | |
|---|---|---|---|---|
| 5,652,876 A * | 7/1997 | Ashe | ................ | G06F 17/2205 703/26 |
| 6,874,707 B2 * | 4/2005 | Skinner | ................ | A01G 17/02 239/542 |
| 7,268,691 B2 * | 9/2007 | Koors | ................ | G01P 5/04 340/601 |
| 7,584,023 B1 * | 9/2009 | Palmer | ................ | A01G 27/00 239/69 |
| 8,024,074 B2 * | 9/2011 | Stelford | ................ | A01G 25/092 137/78.2 |
| 8,412,419 B1 * | 4/2013 | Seamon | ................ | G06Q 50/02 700/283 |
| 2005/0166159 A1 * | 7/2005 | Mondry | ................ | G06F 3/0486 715/769 |
| 2006/0293797 A1 * | 12/2006 | Weiler | ................ | A01G 25/165 700/284 |
| 2007/0168266 A1 * | 7/2007 | Questembert | .......... | G06Q 20/06 705/35 |

(Continued)

Primary Examiner — Kenneth M Lo
Assistant Examiner — Michael J Huntley
(74) Attorney, Agent, or Firm — Suiter Swantz pc llo

(57) ABSTRACT

A crop modeling system includes an irrigation system and a user input device coupled to the irrigation system. The irrigation system and the user input device are configured to communicate with a processor and non-transitory memory storing executable instructions. The executable instructions are configured to cause the processor to open a crop modeling graphical user interface for a geospatial location of a field associated with the irrigation system, move a crop graphical user interface element to a mapped location on the crop modeling graphical user interface responsive to one or more user inputs received via the user input device, generate an in-season crop model by applying the one or more user inputs to the crop model via the moving of the crop graphical user interface element, and generate one or more control signals based on the in-season crop model.

20 Claims, 11 Drawing Sheets

(56) References Cited

U.S. PATENT DOCUMENTS

| | | | | |
|---|---|---|---|---|
| 2007/0260400 A1* | 11/2007 | Morag | ............... | G06Q 10/00 |
| | | | | 702/1 |
| 2009/0005990 A1* | 1/2009 | Anderson | ............ | G06Q 10/00 |
| | | | | 702/2 |
| 2009/0076660 A1* | 3/2009 | Goldberg | ........... | A01G 25/16 |
| | | | | 700/284 |
| 2013/0207771 A1* | 8/2013 | Ersavas | ............ | G05B 15/02 |
| | | | | 340/3.1 |
| 2014/0258173 A1* | 9/2014 | Blanchard | ........... | G06F 19/00 |
| | | | | 705/348 |
| 2015/0032272 A1* | 1/2015 | Neesen | ............ | A01G 25/16 |
| | | | | 700/284 |
| 2016/0309646 A1* | 10/2016 | Starr | ................ | A01C 21/005 |

* cited by examiner

FIG. 3A

Edit Crop

Crop parameters

- Crop type: Corn
- Variety: Channel
- Planting date: 215-32 / 04-15-2015
- Maturity date: 245-52VT9R / 09-07-2015
- Growing days: 144
- GDD required for maturity (°F): 2875
- Maximum rooting depth (in): 36
- Is irrigated? ☑

Irrigation parameters

- Water allocation (in): 12
- Max. irrigation depth (in): 1
- Plant avail. water capacity (in/ft): 1.2
- Max. allowable depletion (%): 75
- Expected water requirement (in): 25.6
- Expected rain (in): 12.7
- Expected irrigation requirement (in): 12.9

114A

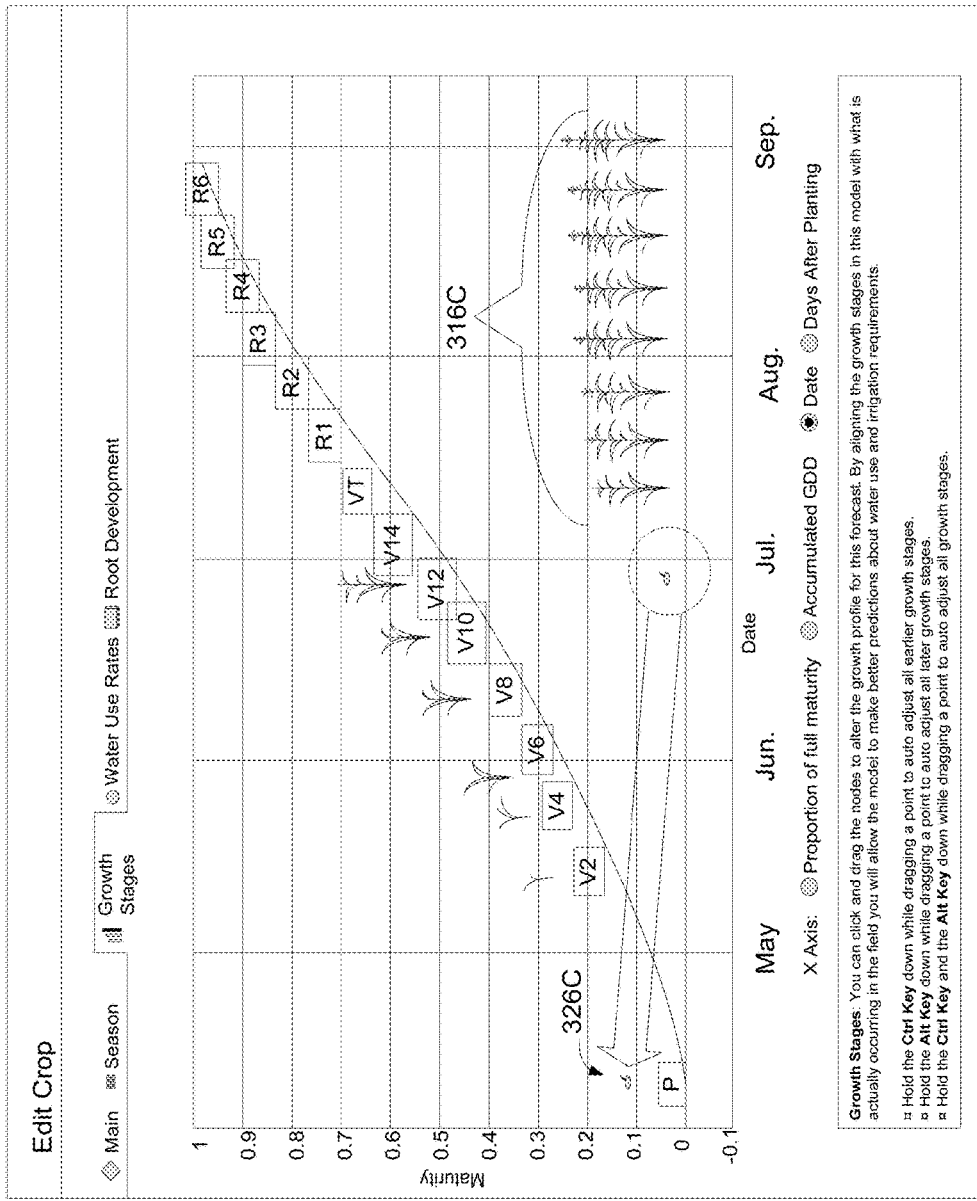

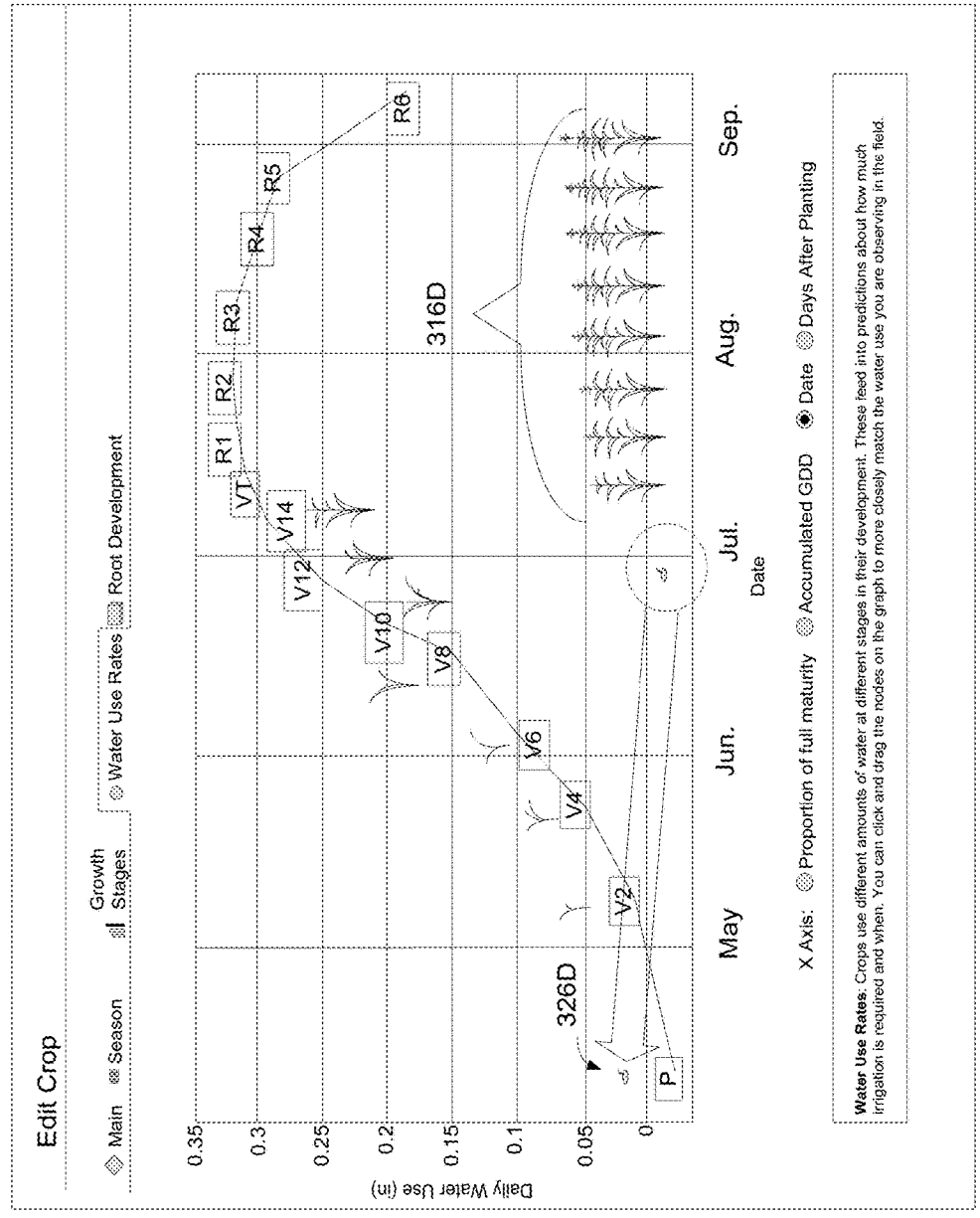

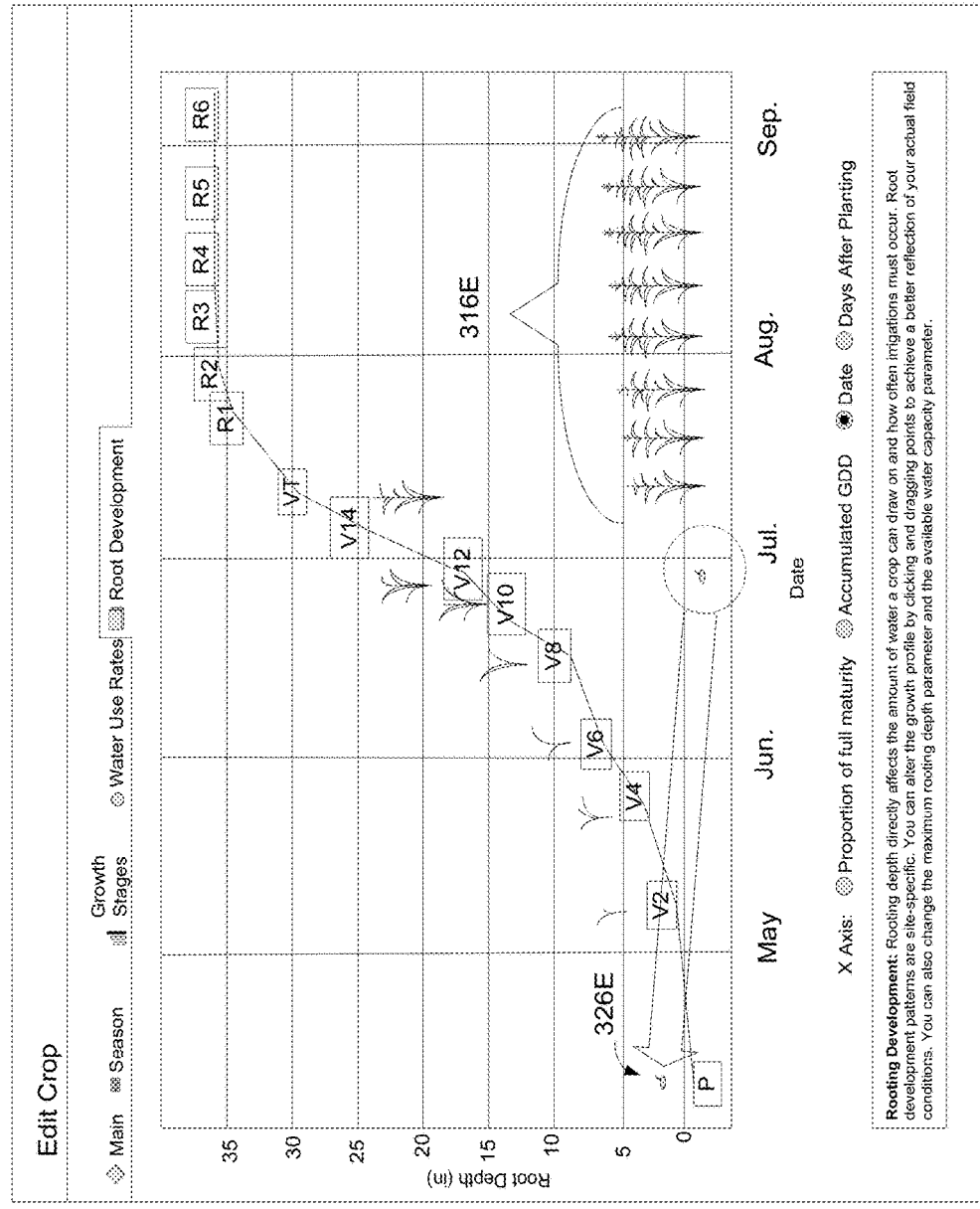

CUSTOMIZED CROP MODELING

PRIORITY

The present application is related to and claims the benefit of the earliest available effective filing date(s) from the following listed application(s) (the "Related Applications") (e.g., claims earliest available priority dates for other than provisional patent applications or claims benefits under 35 USC § 119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation-in-part of patent application Ser. No. 14/496,141 entitled PRECISION VARIABLE RATE IRRIGATION SYSTEM, naming Nick Emanuel as inventor, filed Sep. 25, 2014, which is a continuation-in-part of application Ser. No. 12/584,622, filed Sep. 9, 2009, which is a continuation-in-part of application Ser. No. 12/221,752 filed Aug. 6, 2008 (now abandoned).

All subject matter of the Related Applications is incorporated herein by reference to the extent such subject matter is not inconsistent with the present application.

TECHNICAL FIELD

The present invention generally relates to crop models and graphical user interfaces for controlling and updating crop models.

BACKGROUND

A "crop model" is a simulation model that helps estimate crop growth stage as a function of weather conditions, soil conditions, and choice of crop management practices. The simulator mimics the growth and development of the crop throughout the growing season. The calculations used in the model are based on existing physics, physiology and ecology of crop responses to current environmental conditions.

Crop models are used by farmers, agronomists, agricultural production managers, natural resource managers, crop consultants and strategic analysts to determine an estimate for crop growth, development and yield. Crop models rely on multiple factors as inputs to the model in order to generate an output (e.g., estimated yield). Crop models may be specific to a field, a group of fields or a particular region. Crop models are affected by number, accuracy and relevancy of factors used and underlying algorithms incorporating the factors. If the algorithm does not result in accurate real time results due to conditions that may affect crop growth and development, then the model becomes inaccurate to the specific field, group of fields or region.

SUMMARY

Embodiments of the present disclosure provide systems and methods to update crop models based on real time crop growth stage parameters in-season. The crop models utilize a customizable modeling system that incorporates one or more graphical user interfaces that receive user inputs and/or combinations of user inputs to generate updated and real time data. In one embodiment, a base station of an irrigation system configured to utilize the customizable crop model is disclosed. In another embodiment, the base station includes a processor, a communication connection to communicatively couple the base station with a user input device, and a memory with one or more executable instructions stored thereon such that the processor is configured to perform the following: determine a crop model for each geospatial location of a field associated with a base station, the crop model including forecasted water application rates for each geospatial location of a field associated with the base station, wherein the forecasted water application rates are based on a number of factors including crop growth modeling; receive one or more user inputs within a crop modeling graphical user interface of a user input device; update information stored in said memory in response to the one or more user inputs received; and determine a customized crop model using said updated information, said customized crop model including adapting said forecasted water application rates for each geospatial location of the field associated according to the updated information.

Embodiments of the present disclosure provide methods for updating information in a crop model, and thereby customizing the crop model for a specific field or a specific geospatial location. In one embodiment, a method for updating a crop model comprises: determining a crop model for each geospatial location of a field associated with a base station, said crop model including forecasted water application rates for each geospatial location of a field associated with the base station, and wherein said forecasted water application rates are based on a number of factors including crop growth modeling; receiving one or more user inputs within a crop modeling graphical user interface of a user input device; updating information stored in said memory in response to the one or more user inputs received; and determining a customized crop model using said updated information, said customized crop model including adapting said forecasted water application rates for each geospatial location of the field associated according to the updated information.

Embodiments of the present disclosure provide a system of irrigation systems, each irrigation system of the system of irrigation systems includes a base station configured to update and/or customize a crop model. In one embodiment, the system of irrigation systems includes a crop modeling system utilized to update each individual irrigation system and/or the system of irrigation systems. In one embodiment, the crop modeling system includes a plurality of user input devices. In another embodiment, the crop modeling system includes a system processor communicatively coupled to the plurality of user input devices and a memory with one or more executable instructions stored on the memory such that said processor is configured to perform the following: receive one or more user inputs within a crop modeling graphical user interface of a user input device of the plurality of user input devices, wherein the one or more user inputs are associated with a graphical user interface element representing a growth stage of a type of crop; determine said user input device and said one or more user inputs correspond to a specific irrigation system of a plurality of irrigation systems; send updated information to a base station of said specific irrigation system based on said one or more user inputs; and determine a customized crop model using said updated information, said customized crop model including forecasted water application rates for each geospatial location of a field associated with the base station, and wherein said forecasted water application rates are based on a number of factors including at least crop growth modeling.

BRIEF DESCRIPTION OF THE DRAWINGS

The numerous advantages of the disclosure may be better understood by those skilled in the art by reference to the accompanying figures in which:

FIGS. 3A-3E show conceptual views of Virtual Optimizer (VO) graphical user interfaces, in accordance with embodiments of the present disclosure;

DETAILED DESCRIPTION OF THE INVENTION

Figure 1:
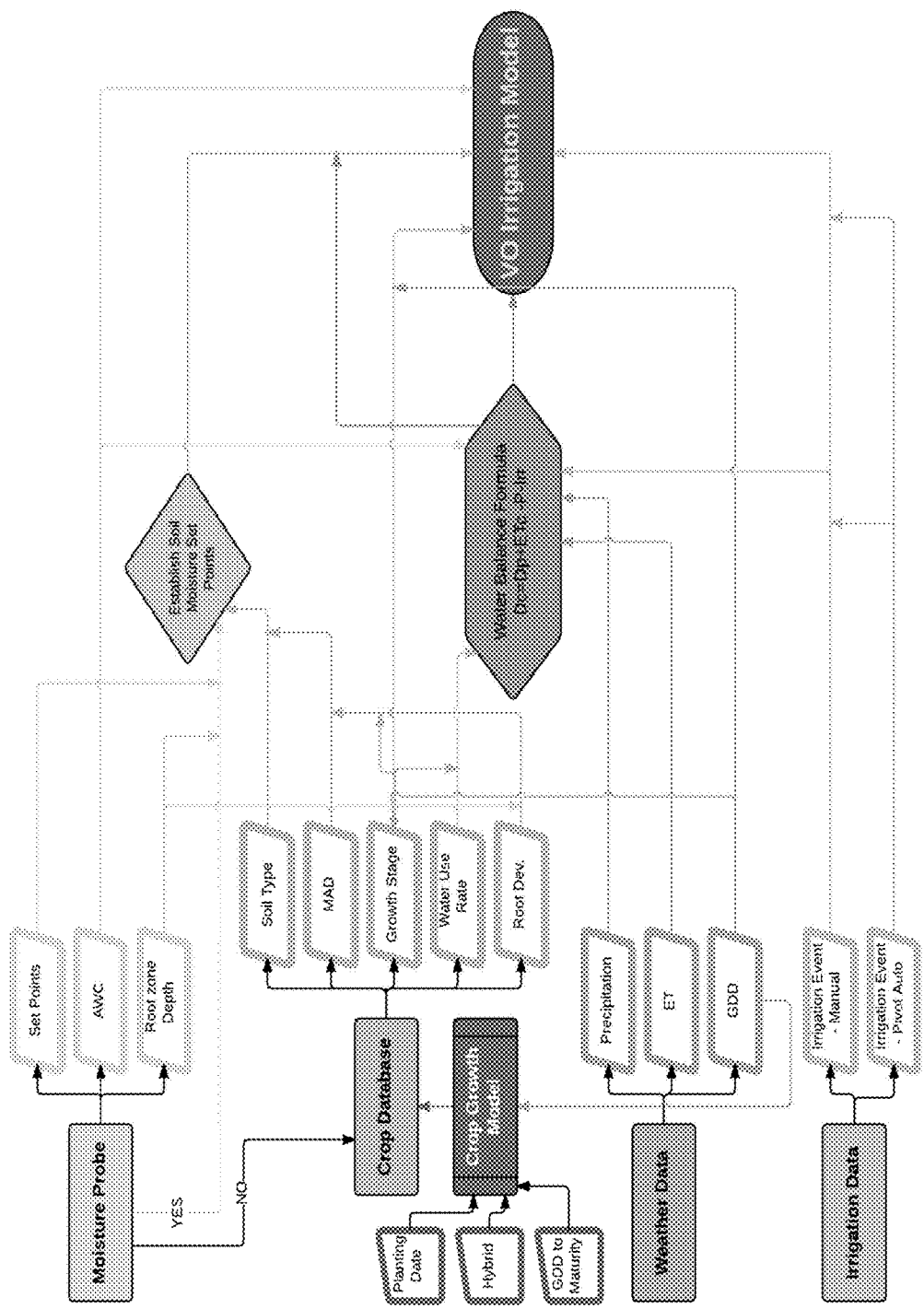
FIG. 1 shows a flow diagram of a customizable crop modeling system, in accordance with one or more embodiments of the present disclosure.

Reference will now be made in detail to the subject matter disclosed, which is illustrated in the accompanying drawings.

Referring generally to FIGS. 1 through 7, systems and methods to update crop models based on real time (e.g., in-season) crop growth stage parameters are described, in accordance with the present disclosure.

As described above, a crop model is a simulation model that helps estimate crop growth stage as a function of weather conditions, soil conditions, and choice of crop management practices. The simulator mimics the growth and development of the crop throughout the growing season. The calculations used in the model are based on existing physics, physiology and ecology of crop responses to current environmental conditions.

Generally, the crop models of the present disclosure may be used according to at least two time frames, a preseason time frame and an in-season time frame. During the pre-season time frame, the crop models of the present disclosure run the water balance equation (e.g., Equation (1) given below) using crop parameters and a ten-year average of weather data as inputs to develop a first crop model, or a first set of crop models. When an in-season time frame begins, irrigation events are triggered as available water capacity (AWC) reaches a refill point as determined during the pre-season time frame.

During the in-season time frame, one or more equations (e.g., the water balance equation) may be run again using real time data to customize or develop a second (e.g., customized) crop model, or a second set of crop models. In embodiments, the crop models are customizable during the in-season time frame with respect to a number of factors, including but not limited to, crop growth stage and development, water use rates, root depth, real time weather data, irrigation events, and moisture probe data, if a moisture probe is available. The updated crop growth stage may include, but is not limited to, a vegetation or reproductive stage of the crop. The updated weather data may include, but is not limited to, precipitation events (e.g., rainfall), evapotranspiration (ET), and growing degree days (GDD—as related to the crop growth stage). The updated irrigation events may include, but are not limited to, manually entered irrigation events and automated machine logs (e.g., pivot machine logs). The updated moisture probe data may include, but is not limited to, original and updated set points, soil daily change (overriding the weather ET and based on crop water use), current AWC, and depth of root zone ($D_{rz}$).

In embodiments, the crop models are customizable during the preseason at least in that the crop models may be set to run based on a subset of the ten-year weather history. For example, the crop model may be configured to run based on the weather history for a selected year. For instance, the operator may feel like this year will be like the summer of '69 and may configure the first crop model or first set of crop models to determine water application rates accordingly. The first crop model or first set of crop models would be further customizable during in-season conditions with updated and real time information (e.g., precipitation events, crop growth stage, etc.).

In embodiments, a customized and/or customizable crop model is referred to herein as a Virtual Optimizer (VO) Irrigation Model. Referring now to FIG. 1, a flow diagram of inputs, algorithms, and/or modules used to generate a VO Irrigation model is illustrated. In embodiments, the VO Irrigation Model may be implemented as hardware, software or a combination of hardware and software. In embodiments, the VO Irrigation Model receives inputs from multiple databases, circuits and/or modules. For example, the VO Irrigation Model may receive inputs from Crop Model and Control Algorithms and/or modules including, but not limited to, a Moisture Probe module, a Crop Database module, a Crop Growth Model module, a Weather Data module, an Irrigation Data module and a Water Balance Equation/Formula module. In embodiments, one or more of the modules receive inputs from sub-modules. For instance, the Moisture Probe module may receive inputs from a Set Point sub-module, an Available Water Capacity (AWC) sub-module and a Root Zone Depth sub-module. In embodiments, one or more of the sub-modules may be set or adjusted by an operator. For instance, the Set Point sub-module may be adjusted by an operator to set one or more of: a Refill point, a Full point or a Maximum Allowed Depletion (MAD) percentage. In embodiments, each of the modules or sub-modules are implemented as hardware, software or a combination of hardware and software.

In embodiments, the VO Irrigation Model is in communication with one or more additional modules. For example, the VO Irrigation Model may be in communication with a User Input and Device Recognition module (see FIG. 2), which may be configured to associate a user input or a user input device with a base station or an irrigation system (e.g., via a media access control (MAC) address or an internet protocol (IP) address).

In embodiments, a base station in communication with an irrigation system, activates or deactivates the irrigation system as a result of a calculated crop model. In further embodiments, the base station automatically increases or decreases the speed or rate of movement of the irrigation system as a result of the calculated crop model. In a given field, there may be a number of geospatial locations, and the base station may determine an accurate rate of movement for the irrigation system for each geospatial location for that field in order to determine and dispense accurate irrigation or fertilization amounts for each field or geospatial location in the field. In embodiments, the crop model that activates, deactivates, automatically increases speed or automatically decreases speed is a crop growth model. In further embodiments, the crop model that activates, deactivates, automatically increases speed or automatically decreases speed is a VO Irrigation Model.

An example of a base station and an irrigation system capable of achieving the above-mentioned advantages is provided in U.S. application Ser. No. 12/584,622, which is incorporated herein by reference in its entirety.

Figure 2:
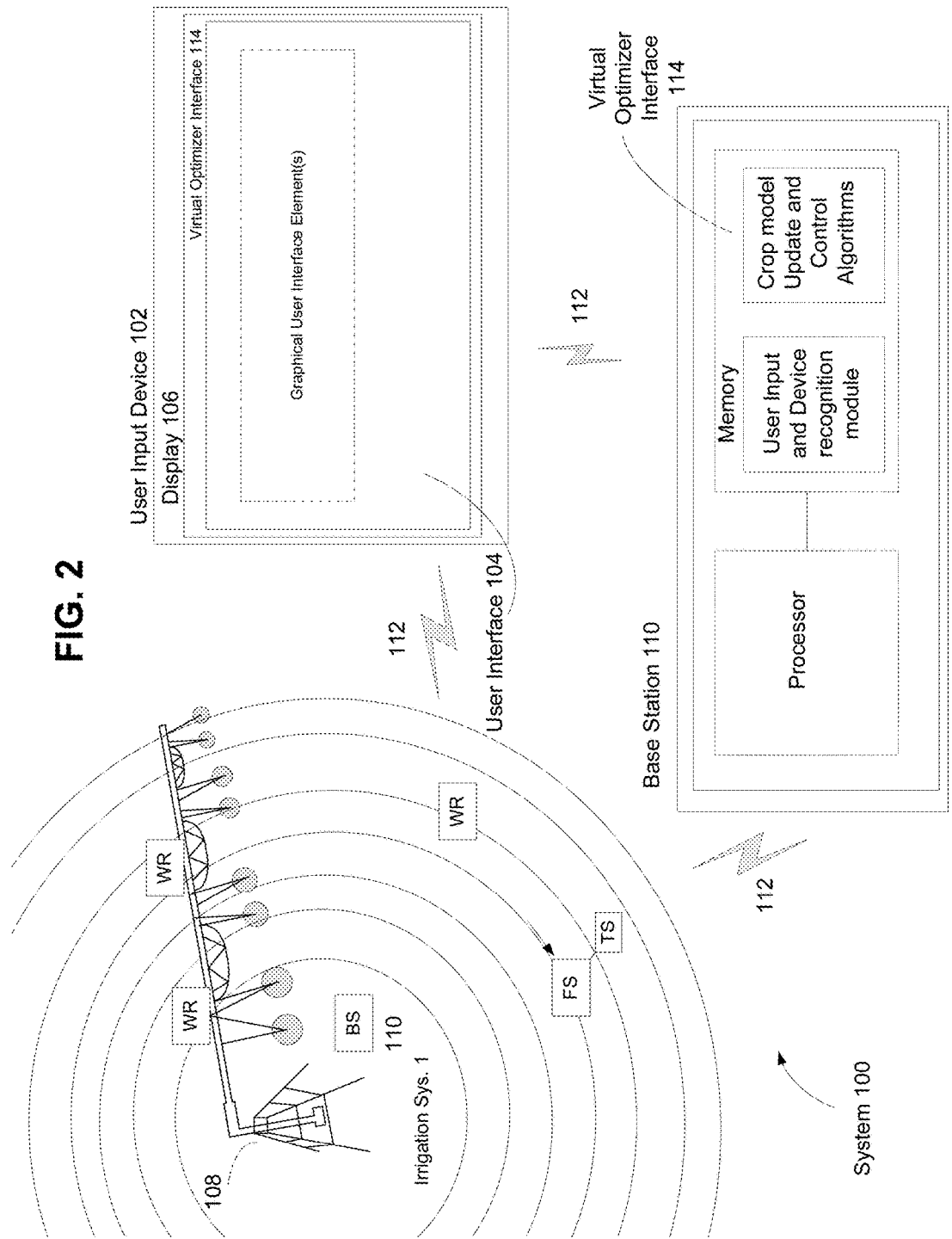
FIG. 2 shows a block diagram of an irrigation system configured to implement a customizable crop modeling system, in accordance with one or more embodiments of the present disclosure.
Figure 3B:
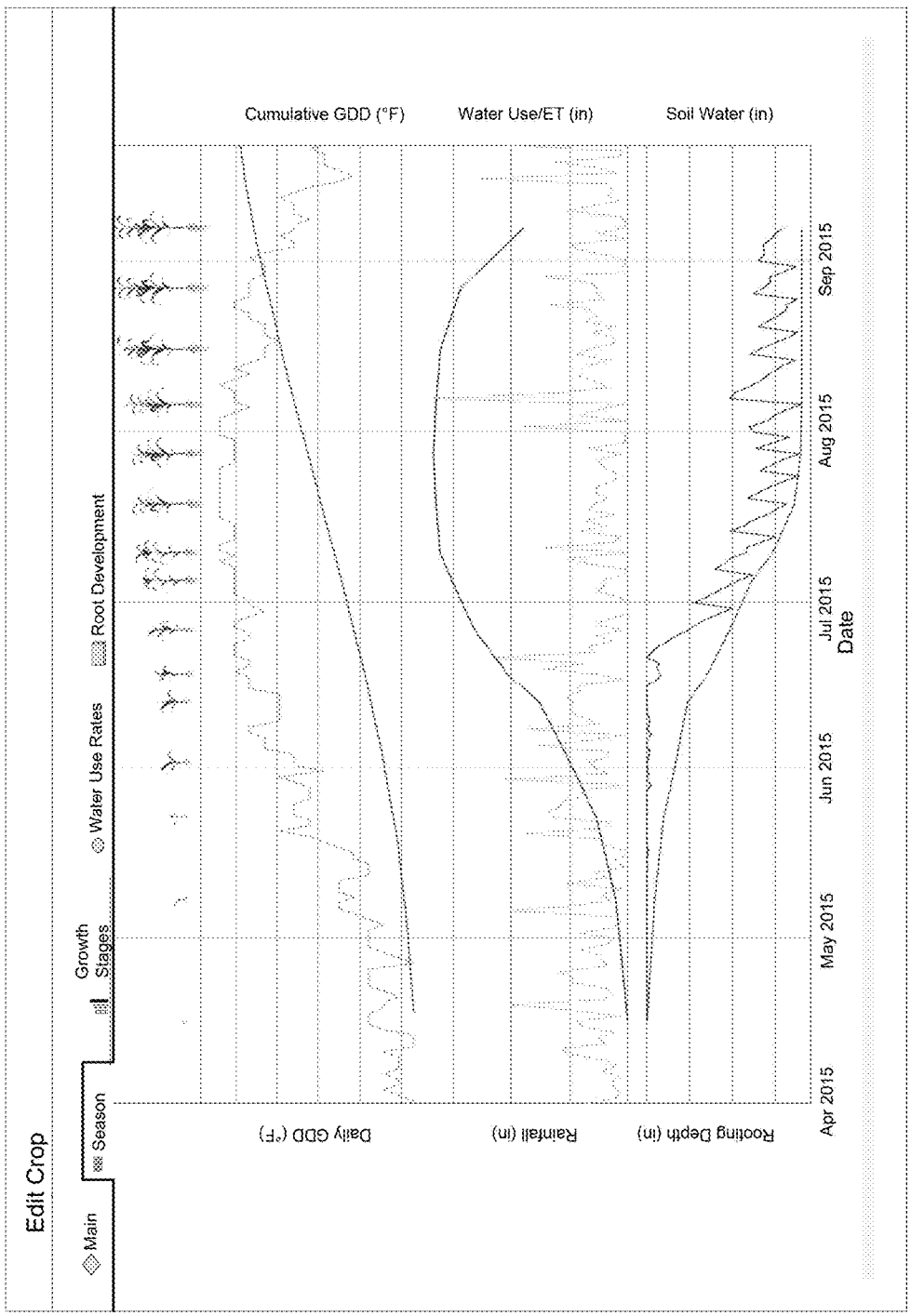
Figure 4:
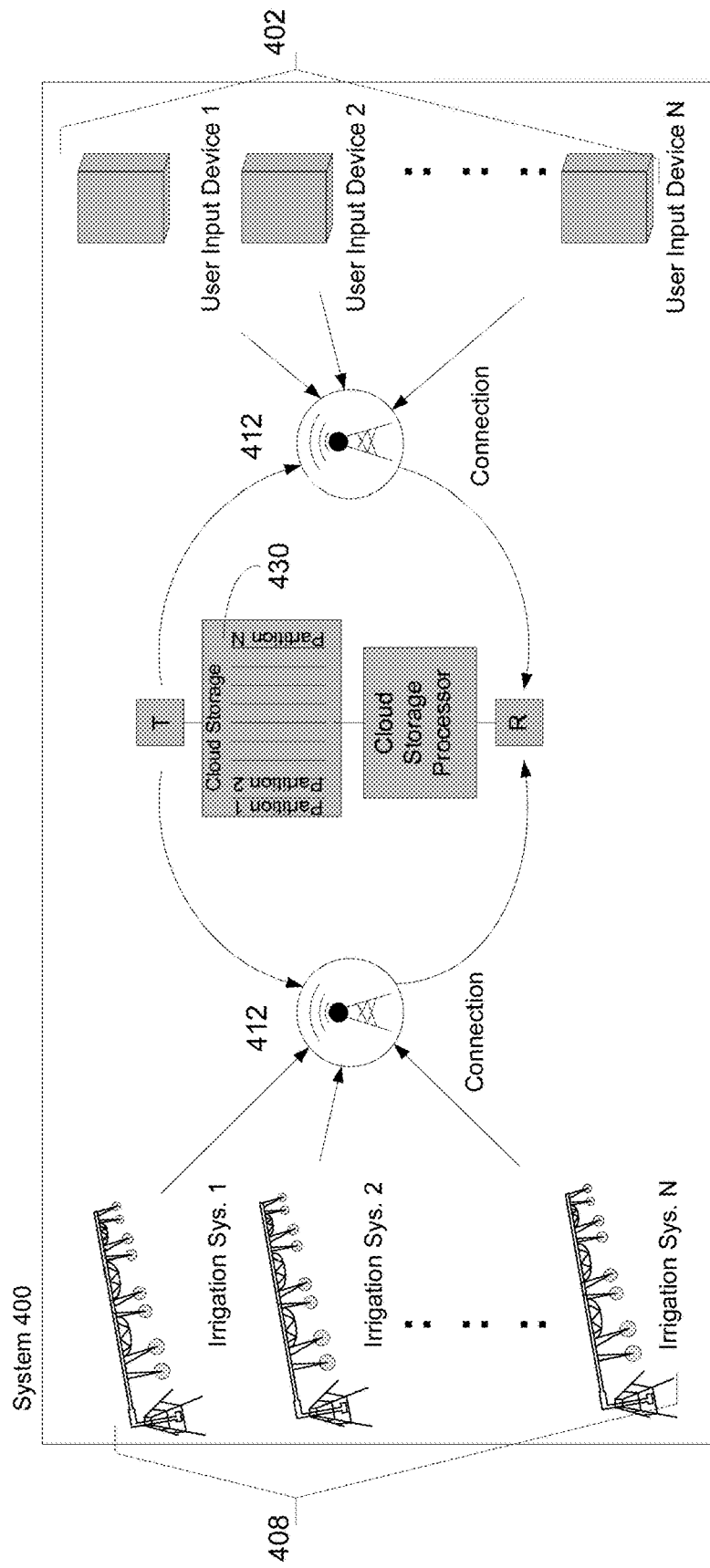
FIG. 4 shows a block diagram of a network of irrigation systems and user input devices configured to implement one or more VO graphical user interfaces to determine one or more customized crop models, in accordance with one or more embodiments of the present disclosure.

In embodiments, an operator is able to access the base station using a user interface of an input device. Referring now to FIG. 2, a user interface 104 of user input device 102 is used to communicate through connection 112 with an irrigation system 108. In embodiments, the user input device 102 communicates with a base station 110 of the irrigation system 108. In embodiments, the user input device 102 and base station 110 are housed together such that the base station 110 and the user input device 102 communicate with the irrigation system 108. In embodiments, the communication connection may be any wired or wireless communication connection including, but not limited to, an Ethernet (or any IEEE 802.11-type) connection, a Fiber Channel connection, a Peripheral Component Interconnect Express (PCIe) connection, a Serial Digital Interface at 1200 baud (SDI-12) connection, universal serial bus (USB) connection, or any suitable communication connection (or combinations thereof) known in the art.

In embodiments, the irrigation system 108 is communicatively coupled with a plurality of receivers, transmitters, or transceivers. For example, irrigation system 108 may be communicatively coupled with a wireless receiver (WR) for collecting field sensor data. In embodiments, the base station 110, or a field station (FS) in communication with the base station 110, may be communicatively coupled with a telemetry system (TS) for transmitting data to a personal computer (e.g., user input device 102), a server, or some other input/output device. In embodiments, the base station is located in the field with the irrigation system 108. In further embodiments, the base station 110 is located at a remote site such as a computer, a web server and/or a similar device. In further embodiments, the base station 110 is located in a common controller housing with the user input device 102.

In embodiments, the user interface 104 is displayed using a display 106 of user input device 102. In embodiments, user input device 102 includes, but is not limited to, a touchscreen enabled tablet computer, a smart phone, a general purpose computer with a keyboard and mouse, a laptop computer, a haptic input device, a voice activated input device, or combinations thereof.

The display 106 may include any display device known in the art. In some embodiments, the display 106 may include, but is not limited to, a liquid crystal display (LCD). In further embodiments, the display 106 may include, but is not limited to, an organic light-emitting diode (OLED) based display. In further embodiments, the display 106 may include, but is not limited to, a cathode-ray tube (CRT) display. In a general sense, any display device capable of integration with a user interface device (e.g., touchscreen, bezel mounted interface, keyboard, mouse, trackpad, and the like) may be implemented. In the case of a touchscreen interface device, those skilled in the art should recognize that a large number of touchscreen interface devices may be suitable for implementation. For instance, the display 106 may be integrated with a touchscreen interface, such as, but not limited to, a capacitive touchscreen, a resistive touchscreen, a surface acoustic based touchscreen, an infrared based touchscreen, or the like. In a general sense, any touchscreen interface capable of integration with the display portion of the display 106 is suitable for implementation.

In embodiments, the base station 110 includes a processor and a memory with one or more executable instructions stored thereon such that the processor is configured to perform one or more method steps of the present disclosure. For example, the processor may process the one or more executable instructions in order to determine a crop model for each geospatial location of a field associated with base station 110. In embodiments, the crop model is used to determine forecasted water application rates for each geospatial location of the field associated with the base station 110. In embodiments, the forecasted water application rates are based on a number of factors including crop growth modeling, weather forecast modeling, geospatial data information, crop sensor information, and variable rate irrigation management and control.

In embodiments, the base station 110 includes a Virtual Optimizer (VO) interface 114 that is utilized to create a Virtual Optimizer Irrigation Model. In embodiments, the VO interface 114 is implemented using multiple blocks and/or modules in communication with one or more processors in order to determine a VO Irrigation Model. In embodiments, the VO interface 114 is programmed to allow inputs at various times (e.g., preseason inputs and in-season inputs). For example, during an initial time phase (e.g. preseason) a programmer may pre-program the VO interface 114 with one or more modules and/or algorithms that are not user-modifiable. In further embodiments, the preseason component of the VO interface 114 is interactive, with a portion of the pre-programmed modules and/or algorithms accepting user inputs and making them, at least in-part, user-modifiable.

In embodiments, inputs are received during a user installation phase (e.g., still preseason time phase) to determine a crop model for a given field. In this regard, the user inputs may include, but are not limited to, crop type, crop variety, the number of growing degree days (GDD) required for the crop to reach maturity, maximum rooting depth, soil type, water allocation for a region, and Electric Energy Demand forecast component (e.g., electric utility load control hours and/or days on and off). For example, referring now to FIG. 3A, a VO interface 114A may include one or more graphical user interfaces (e.g., 'Crop Parameters' interface) configured to receive a first set (e.g., one or more) of user inputs. In embodiments, after receiving the first set of user inputs, at least a second graphical user interface is generated in order to allow an operator to enter a second set of user inputs. For instance, referring again to FIG. 3A, a first set of user inputs to the Crop Parameters interface of VO interface 114A may include an indication that a field or geospatial location is irrigated. After receiving the indication that the field or geospatial location is irrigated, the second graphical user interface is generated (e.g., 'Irrigation Parameters' interface). In this regard, inputs to a second graphical user interface may include, but are not limited to, max irrigation depth, plant available water capacity, max allowable depletion, expected water requirement, expected rain, and expected irrigation requirement.

In embodiments, the VO interface 114 may include a number of pre-programmed databases (e.g., crop database, soil database, etc.) with information related to a number of crops commonly grown for a particular region, such that the user need only input the crop type during user installation, and the VO interface 114 generates related information (e.g., GDD required for maturity, max rooting depth, max irrigation depth, minimum irrigation depth, plant available water capacity, etc.) to determine a crop model.

In embodiments, after receiving the first and/or the second set of user inputs, a first set of crop models are generated. For example, the first set of crop models may be based on a stored history of parameters for the field and/or geospatial location. For instance, referring now to FIG. 3B, a VO graphical user interface 114B (e.g., 'Season' interface) including expected and/or customizable (i.e., customizable during the season) crop parameters for one or more crop models may be generated. In this regard, the crop parameters may include, but are not limited to, daily GDD, cumulative GDD, rainfall, water use and/or evapotranspiration (ET), rooting depth, and soil water. In embodiments, the 'Season' interface may be updated by dragging and dropping graphical user interface elements to specific mapped locations within the interface.

In embodiments, an in-season component of the VO interface 114 is interactive, receiving one or more real time inputs during an in-season time phase. For example, referring to FIG. 3C, VO interface 114C may receive one or more user inputs to update a crop model associated with a field or a specific geospatial location. For instance, the VO interface 114C may display a plotline in a portion of the interface including various interactive graphical user interface elements. In embodiments, each of the graphical user interface elements displayed are associated with and representative of a growth stage of a crop type. In embodiments, both vegetative (e.g., VE to VT) and reproductive stages (R1 to R6) are represented. In embodiments, a growth stage may be derived from the Feeks scale, the Zadocks scale, the Haun scale, a Biologische Bundesanstalt, Bundessortenamt and Chemical industry (BBCH) scale, a similar plant growth scale, or combinations thereof.

In embodiments, the VO interface 114 is not limited to customization with respect to crop growth stage. For example, FIG. 3D shows a conceptual view of a VO interface 114D that is customizable with respect to water use rates. By way of another example, FIG. 3E shows a conceptual view of a VO interface 114E that is customizable with respect to root depth.

In embodiments, a user interacts with the VO interface 114 at least by selecting (e.g., touch, click, voice activated description, etc.) a specific graphical user interface element (e.g., graphical user interface element 316C, 316D, or 316E). The VO interface 114 associates the specific graphical user interface element selected with updated or real time information as a user applies a constant application of pressure (e.g., click or touch over an extended period of time) to the specific graphical user interface element and moves (e.g., drags) the graphical user interface element to a mapped location within the VO interface 114. In embodiments, the combination of selecting, applying constant pressure over an extended period of time, and moving the graphical user interface element to a mapped location within the VO interface 114 is referred to herein as a 'click-and-drag' or a 'touch-and-drag' user input.

In embodiments, the VO interface 114 implements multiple mapped locations in order to associate a graphical user interface element with updated or real time information for a crop (e.g., a growth stage of a crop). For example, a mapped location may include an x-coordinate and a y-coordinate, with information associated with the crop represented in the y-axis (e.g., crop maturity) and with information associated with the crop represented in the x-axis (e.g., proportion of maturity, accumulated GDD, calendar date, or days after planting). In embodiments, when the selected graphical user interface is moved to a mapped location, the crop model for the field or geospatial location is automatically updated according to the information associated with the placement of the graphical user interface element. For example, a graphical user interface element depicting a coleoptile may be moved to a portion of the VO interface 114 that represents a timeline with plant maturity charted in the y-axis against calendar dates in the x-axis (see FIG. 3A; see also FIGS. 3B and 3C where daily water use and root depth are charted in the y-axis). In this regard, a user may click-and-drag the coleoptile to the calendar date of emergence (which may be labeled VE, or a label VE is generated after being moved). Accordingly, the VO interface 114 automatically updates the crop model with the updated information. In embodiments, information associated with the crop and represented in the x-axis or in the y-axis is referred to herein as an indicator. For instance, in FIG. 3A, the 'Date' indicator on the x-axis has been selected to update the crop growth stage accordingly.

In embodiments, the VO interface is configured to interactively control multiple irrigation systems. Referring now to system 400 of FIG. 4, VO interface 114 is used to selectively control one or more irrigation systems 408 of multiple irrigation systems that are in communication 412 with a user input device 402 of multiple user input devices implementing VO interface 114. In embodiments, a user input device 402 of the multiple user input devices implements user interface 504 (see FIG. 5) to implement a VO interface 514. In further embodiments, each of the multiple user input devices have a VO interface 114 to communicate with a single irrigation system 408 of the multiple irrigation systems.

In embodiments, a user input device 402 is configured to communicate with multiple base stations (not shown), each base station receiving inputs from a particular irrigation system 408, calculate information for an associated crop model (e.g., VO Irrigation Model), and relay that information to the user input device 402 implementing the VO interface 114. In further embodiments, the user input device is configured to communicate with a single base station that is configured to communicate with multiple irrigation systems (e.g., receive inputs from each irrigation system and associate those inputs with the specific irrigation system from which they were received).

In embodiments, the multiple irrigation systems are communicatively coupled through a network connection 412. In embodiments, the network connection 412 includes, but is not limited to, a virtual private network (VPN) connection, a local area connection (LAN), an Ethernet connection, a wide area network (WAN) connection, a metropolitan area network (MAN) connection, a similar network connection, or combinations thereof.

In embodiments, the multiple irrigation systems are communicatively coupled with a mass storage device 430 with multiple partitions (e.g., cloud storage). In embodiments, the mass storage device 430 is in communication with a processor, a transmitter and a receiver (or a transceiver). In embodiments, the mass storage device is utilized to store a history of information associated with a particular field or geospatial location (e.g., previous associated growing seasons), which are accessible via VO interface 114 or VO interface 514. In embodiments, the partitions of the mass storage device are associated with a specific irrigation system, with a season of a particular irrigation system, or with a season of multiple irrigation systems.

In embodiments, multiple input devices are communicatively coupled 412 through the network to the multiple irrigation systems. In embodiments, a specific user input device 402 of the multiple input devices is associated with a specific irrigation system 408 (e.g., via MAC address or IP address) in order to receive inputs from the specific user input 402 device and update a crop model associated with the specific irrigation system 408.

Figure 5:
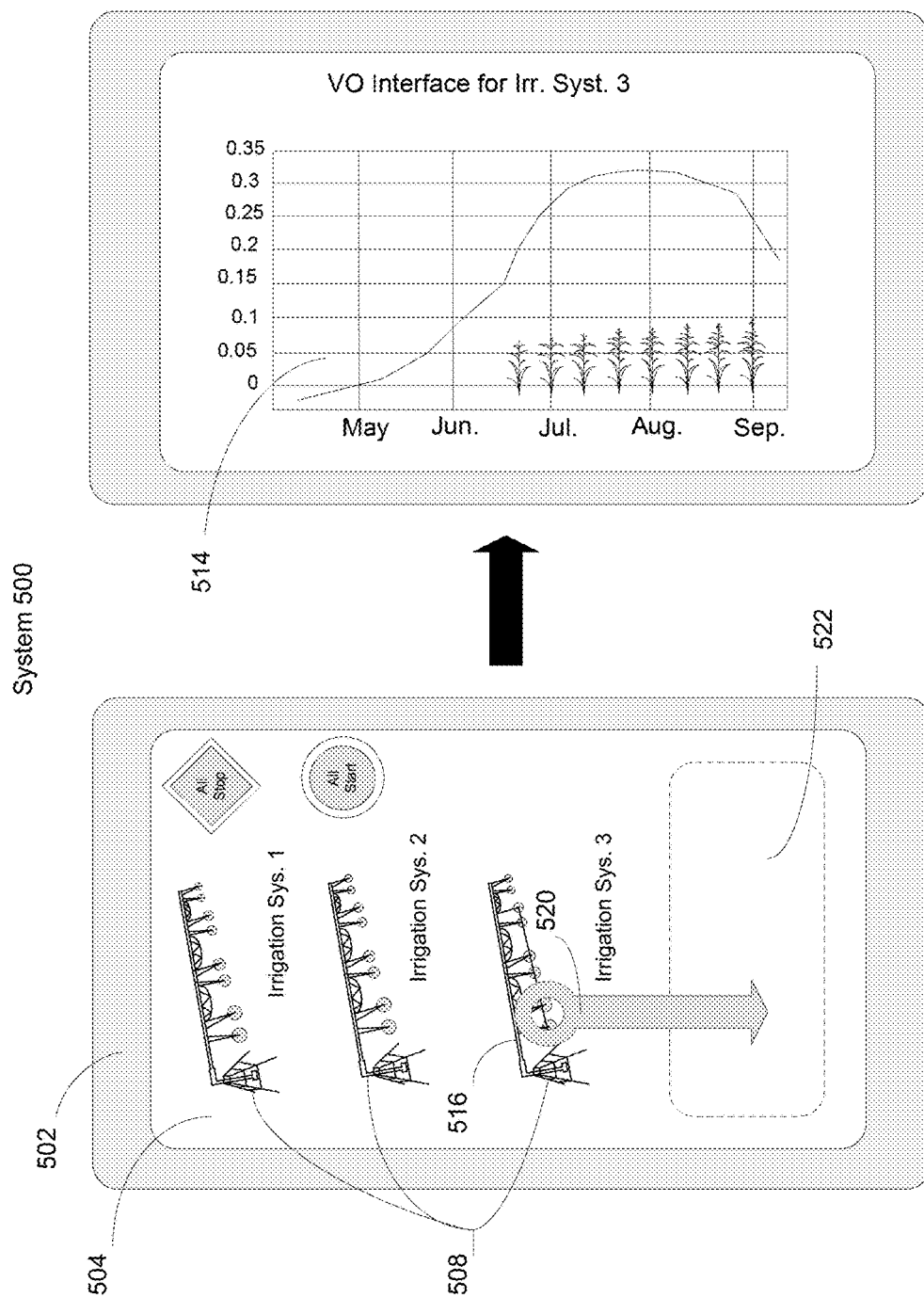
FIG. 5 shows a user input device implementing two graphical user interfaces, in accordance with one or more embodiments of the present disclosure.

In embodiments, a user interface representing a diagram of all irrigation systems for which crop models have been calculated is implemented. Referring now to FIG. 5, the user interface 504 of user input device 502 may incorporate drag-and-drop features (e.g., click-and-drag and/or touch-and-drag) in order to drag 520 a graphical user interface element 516 representing a specific irrigation system of multiple irrigation systems 508 to a mapped location 522 of the user interface 504. When the graphical user interface element 516 is placed in the mapped location 522, a VO interface 514 for the specific irrigation system of the multiple irrigation systems 508 automatically opens in order to customize a crop model associated with a field of the specific irrigation system. In embodiments, the associated crop model is customizable with respect to a specific geospatial location within the field.

In embodiments, the pre-programmed modules and/or algorithms used to implement the VO interface 114 include multiple algorithms to determine forecasted water application rates or forecasted fertilizer rates. For example, a pre-programmed algorithm may comprise a water balance equation according to the following:

$$D_c = D_p + ET_c - P - Irr - U + SRO + DP \quad (1)$$

where $D_c$ is the soil water deficit (net irrigation requirement) in the root zone for the current day (if it is negative, the VO interface 114 automatically set this value to zero); $D_p$ is the soil water deficit on the previous day; $ET_c$ is the crop evapotranspiration rate for the current day; P is the gross precipitation for the current day; Irr is the net irrigation amount infiltrated into the soil for the current day; U is the upflex of the shallow ground water into the root zone; SRO is the surface runoff; and DP is the deep percolation or drainage.

It is noted that a soil water deficit is the difference between the Field Capacity and the Current Soil Water Content. In embodiments, a moisture probe is used to determine Current Soil Water Content. When a probe is used, then the water balance equation may be configured to subtract (or a user subtracts) the current soil available water capacity (AWC) from the field capacity of the root zone of the plant.

It is further noted that if the evapotranspiration rate is unavailable from the weather data, then the water balance equation may be configured to determine (or a user determines) this information from the Crop Water Use Rate by growth stage. For example, $$ET_c = ET_r \times K_c \quad (2)$$

where $K_c$ is the crop coefficient by crop growth stage.

In further embodiments, the water balance equation may be simplified according to the following:

$$D_c = D_p + ET_c - P - Irr \quad (3)$$

In embodiments, the pre-programmed modules and/or algorithms include multiple algorithms to determine forecasted water application rates or forecasted fertilizer rates. For example, a pre-programmed algorithm may comprise a Management allowed Depletion (MAD) equation according to the following:

$$d_{MAD} = \left(\frac{MAD}{100}\right) \times AWC \times D_{rz} \quad (4)$$

where $d_{MAD}$ is the depth of water in the field and/or geospatial location (in inches of water); MAD is the management allowed depletion (as a percentage); AWC is the available water capacity of the root zone (FC—see equation below); and $D_{rz}$ is the depth of the root zone.

In embodiments, in order to determine the AWC thresholds for a particular field or geospatial location within the field, the soil type and a number of other factors are taken into account. For example, the field capacity (e.g., full point or max level) of a field or geospatial location may be determined according to the following:

$$FC = D_{rz} \quad (5)$$

where $D_{rz}$ identifies a soil type (ST) depth used in the calculation. If no $D_{rz}$ is available, then the total ST AWC is proportional to a summation of the soil types (e.g., total ST AWC≈ST1+ST2+ST3+ST4). If the $D_{rz}$ is equal to twelve inches (12"), then FC≈ST1. If $D_{rz}$ is equal to twenty-four inches (24"), then FC≈ST1+ST2. If $D_{rz}$ is equal to thirty-six inches (36"), then FC≈ST1+ST2+ST3. If $D_{rz}$ is equal to forty-eight inches (48"), then FC≈ST1+ST2+ST3+ST4.

The relationships of FC, AWC and $D_{rz}$ may be further illustrated by the following example:

Example: A given field has soil type 1=1.2"; soil type 2=0.9"; soil type 3=1.0"; and soil type 4=1.0". The default field capacity (FC) will be 4.1"; however, if $D_{rz}$ is equal to 24", then the FC≈2.1". If the $D_{rz}$ equals 18", then the FC≈1.65" (e.g., FC≈ST1+(ST2*0.5)).

In embodiments, a refill point may be based on the Management Allowed Depletion (MAD) module and the depth of water in the field ($d_{MAD}$). For example, the irrigation point may be given according to the following equation:

$$RP = FC \times MAD \quad (6)$$

Based on the example with the field of four different soil types, given above, the refill point may be determined according to the following:

$$RP = 4.1 \times 75\% = 3.075 \quad (7)$$

Figure 6:
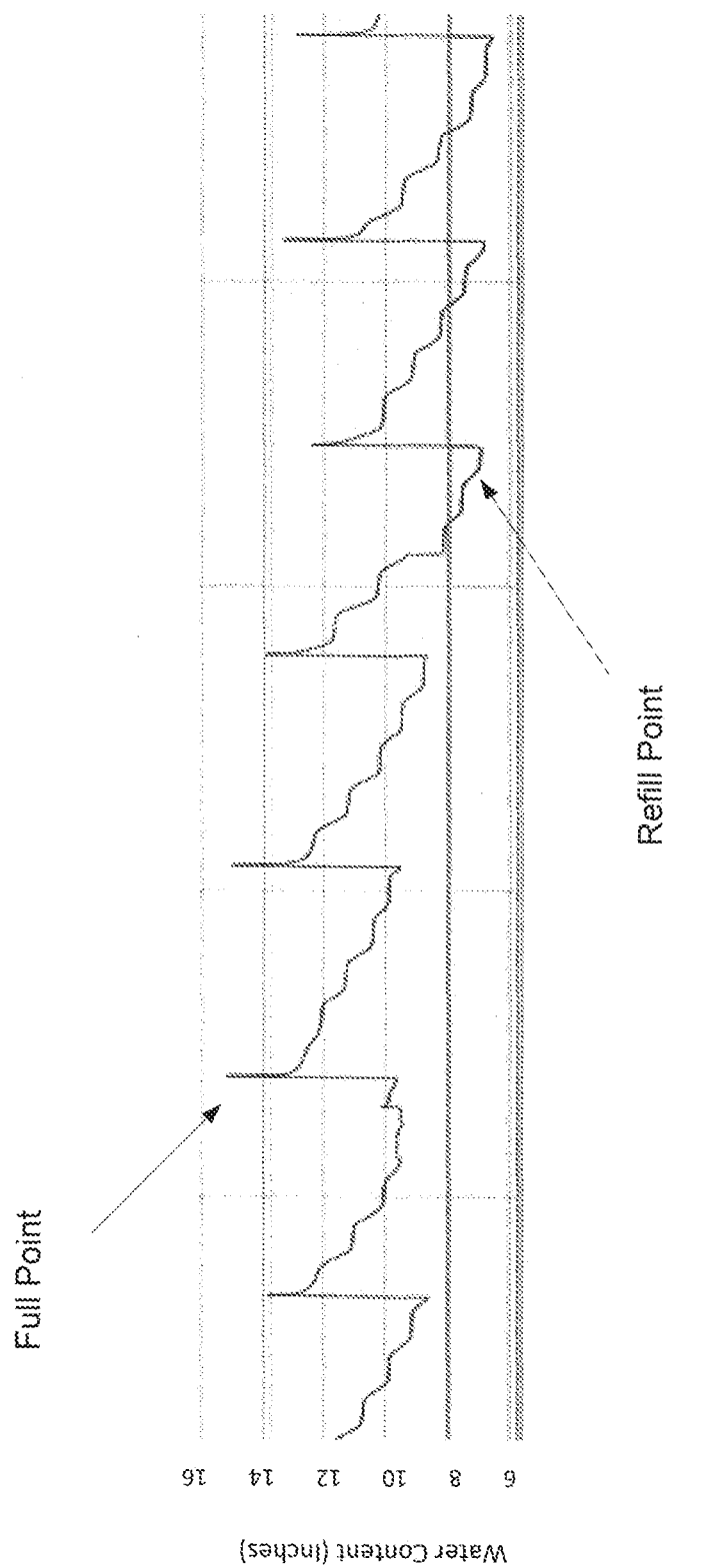
FIG. 6 shows a graphical representation of water content, field water applications, water depletions, a Full Point and a Refill Point in accordance with one or more embodiments of the present disclosure.

A graphical representation of water content, field water applications and water depletions is illustrated in FIG. 6. If no water probe is available in the irrigation system, then the FC may be calculated using Equation (5) listed above. In embodiments, when the model determines the root zones of a crop have reached a full point, or a refill point, the model respectively turns off or on the irrigation system (e.g., see FIG. 6).

The embodiments of systems 100, 400 and 500 illustrated in FIGS. 1-6 may be further configured as described herein. In addition, the systems 100, 400 and 500 may be configured to perform any other step(s) of any of the method embodiment(s) described herein. The following method embodiments relate to customizable crop modeling. It is generally recognized that systems 100, 400 and 500 are suitable for implementing the determining, updating, customizing, and/or recalculating steps of the following embodiments. It is noted, however, the methods described below are not limited to the architectures of systems 100, 400 or 500.

Figure 7:
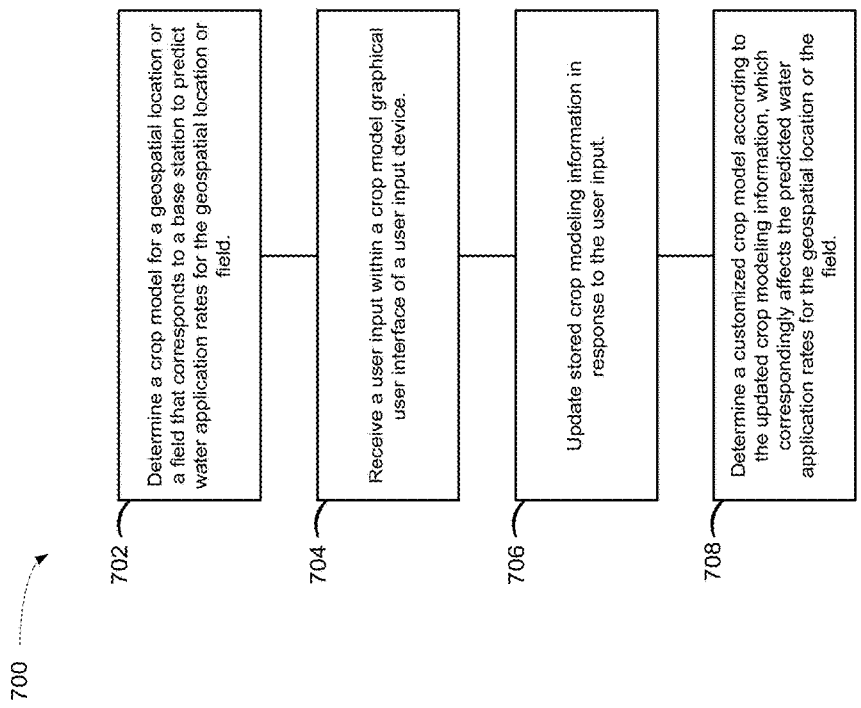
FIG. 7 shows a flow diagram of a method for determining a crop model and optimizing and/or customizing the crop model, in accordance with one or more embodiments of the present disclosure.

FIG. 7 illustrates a flow diagram depicting a crop model optimization process, in accordance with one or more embodiments of the present disclosure.

In step 702, a first crop model (e.g., crop growth model) or a first set of crop models are determined for a geospatial location or a field. In embodiments, the geospatial location or field corresponds to a base station for which the crop model is used to predict water application or fertilization rates to be applied to the geospatial location or the field. For example, a user input device may be programmed to allow a user to access user interface 114 during a preseason time phase and enter the crop type of the field or geospatial location. Upon receiving the crop type, the user interface is in communication with a base station 110 with one or more databases (e.g., crop database) that calculates one or more crop models for the field or geospatial location based on the crop type input.

In step 704, a crop model graphical user interface implemented on a user input device is configured to receive one or more user inputs. For example, the one or more user inputs may include a click-and-drag, touch-and-drag or drag-and-drop user input to move a graphical user interface element to a mapped location of a graphical user interface 114. For instance, referring to FIGS. 3A-3E, a graphical user interface element 326 representing a coleoptile may be selected by dragging and dropping the coleoptile graphical user interface element to a y-coordinate that may indicate the initial level of maturity of a plant and an x-coordinate that may indicate the date that initial level of maturity was reached. In embodiments, the crop model graphical user interface is enabled to receive a combination of user inputs (e.g., pressing 'aft' and/or 'ctrl+alt' while dragging and dropping a graphical user interface element representing a crop growth stage). It is noted that the selection and moving of graphical user interface element 326 is merely for illustrative and explanatory purposes. In this regard, any of the graphical user interface elements 316 may be selected and moved to update the crop model via VO interface 114. It is further noted that a person skilled in the art will recognize any number of graphical user interface elements that may be selected and dragged-and-dropped to customize a crop model in accordance with the systems and methods of this disclosure.

In step 706, the information used to determine the first crop model or the first set of crop models in step 702 is updated in response to the one or more user inputs. For example, by moving the coleoptile graphical user interface element to the y-coordinate and x-coordinate in step 704, the user interface 114 may automatically update the date that the initial maturity was reached.

In embodiments, multiple irrigation systems are associated with a single graphical user interface 114. Nevertheless, the graphical user interface 114 is configured to update a crop model for one specific field or one geospatial location without updating the crop models for another irrigation system of another field or another geospatial location, creating one or more unique crop models. In embodiments, the uniqueness of the crop models is directly related to the moisture content of the different fields or different geospatial locations associated with the graphical user interface 114. In this regard, if multiple fields or multiple geospatial locations are determined to have the same moisture content (e.g., as within a specified threshold), then the graphical user interface may be further configured to issue one command to activate or deactivate each irrigation system associated with the graphical user interface 114 (e.g., a 'stop all' or a 'start all' feature).

Still in step 706, in embodiments, a user may utilize a combination of user inputs in order to update earlier or later crop growth stages. For example, a user may press the Ctrl key while dragging and dropping the graphical user interface element to a mapped location in order to update all earlier crop growth stages. By way of another example, a user may press the Alt key while dragging and dropping a graphical user interface element to a mapped location in order to update all later crop growth stages according to the selected (e.g., dropped) crop growth stage. By way of yet another example, a user may press the Ctrl and the Alt key while dragging and dropping in order to update all earlier and later growth stages at the same time as the selected graphical user interface element is dragged and dropped. It is noted that the examples given above with respect to the combination of user inputs is merely for illustrative and explanatory purposes. In this regard, those skilled in the art will recognize that any combination of user inputs may be utilized to communicate with the graphical user interface 114, and that earlier and/or later growth stages should be updated according to the selected (e.g., dragged-and-dropped) growth stage.

In step 708, an updated or customized crop model (e.g., VO Irrigation Model) is determined according to the updated crop modeling information. In this regard, the water application and fertilization application rates will also be recalculated based on the updated information. In embodiments, the recalculated water/fertilization rates are specific to a field or a geospatial location. In embodiments, the crop model is updated throughout the season to determine a virtually optimized crop model and optimized water/fertilization application rates for the field or the geospatial location.

In embodiments, the graphical user interface 114 generates one or more access points for an update, customization or optimization that occurs in the crop model. For example, the graphical user interface 114 may be in communication with a non-transitory memory. When updates occur, the non-transitory memory may create a record of each update. For instance, the record may include at least the date, time and the crop growth stage updated. In embodiments, the record includes a hyperlink, which is linked to the information, or at least a portion of the information, that was changed during the update. In embodiments, a record including a hyperlink is referred to herein as an access point.

Applicant notes that the above ordering of steps should not be interpreted as limiting. It is anticipated that at least a portion of the steps of process 700 may be carried out in a different order.

All of the methods described herein may include storing results of one or more steps of the method embodiments in a storage medium. The results may include any of the results described herein and may be stored in any manner known in the art. The storage medium may include any storage medium described herein or any other suitable storage medium known in the art. After the results have been stored, the results can be accessed in the storage medium and used by any of the method or system embodiments described herein, formatted for display to a user, used by another programmed module, method, or system, etc. Furthermore, the results may be stored "permanently," "semi-permanently," temporarily, or for some period of time. For example, the storage medium may be random access memory (RAM), and the results may not necessarily persist indefinitely in the storage medium.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed:

1. A crop modeling system comprising:
   an irrigation system; and
   a user input device communicatively coupled to the irrigation system via a communication connection,
   wherein the irrigation system and the user input device are configured to communicate with a processor and a non-transitory memory with one or more executable instructions stored thereon, wherein the processor is configured to execute the one or more executable instructions, wherein the one or more executable instructions are configured to cause the processor to:
   open a crop modeling graphical user interface for a geospatial location of a field associated with the irrigation system, wherein the crop modeling graphical user interface includes a crop model for the geospatial location of the field;
   move a crop graphical user interface element to a mapped location on the crop modeling graphical user interface responsive to one or more user inputs received via the user input device, wherein the one or more user inputs correspond to the geospatial location of the field, wherein the one or more user inputs at least partially include data obtained during an in-season timeframe;
   generate an in-season crop model by applying the one or more user inputs to the crop model via the moving of the crop graphical user interface element, wherein the in-season crop model includes one or more forecasted water application rates for the geospatial location of the field;
   store the in-season crop model as a list of one or more updates made to the in-season crop model, wherein a history of the one or more updates is retrievable via an access point; and
   generate one or more control signals based on the in-season crop model, wherein the one or more control signals are configured to adjust one or more components of the irrigation system.

2. The system of claim 1, wherein the crop graphical user interface element is one of a plurality of crop graphical user interface elements, wherein the crop graphical user interface element is associated with and representative of a growth stage of the type of crop.

3. The system of claim 1, wherein the crop modeling graphical user interface includes at least one of a main input parameter tab, a season tab, a growth stage tab, a water use rate tab, or a root development tab.

4. The system of claim 1, wherein the one or more generated control signals are configured to activate or deactivate the one or more components of the irrigation system at least based on level of water content at the geospatial location of the field.

5. The system of claim 1, wherein the one or more user inputs include at least one of a click-hold-and-drag user input or a touch-hold-and-drag user input.

6. The system of claim 1, wherein the access point is a record including at least one of a date or a time of the one or more updates.

7. The system of claim 1, wherein the crop model includes at least one of one or more earlier growth stages or one or more later growth stages.

8. The system of claim 7, wherein the in-season crop model is generated by applying the one or more user inputs to at least one of the one or more earlier growth stages or the one or more later growth stages of the crop model.

9. The system of claim 1, wherein the one or more executable instructions are further configured to cause the processor to:
  implement at least one indicator by which to reference the one or more user inputs and associate the one or more user inputs to plant development,
  wherein the at least one indicator includes at least one of proportion of full maturity, accumulated growing degree days, date, or days after planting.

10. A method for updating a crop model comprising:
  opening a crop modeling graphical user interface for a geospatial location of a field associated with an irrigation system, wherein the crop modeling graphical user interface includes a crop model for the geospatial location of the field;
  moving a crop graphical user interface element to a mapped location on the crop modeling graphical user interface responsive to one or more user inputs received via a user input device communicatively coupled to the irrigation system via a communication connection, wherein the one or more user inputs correspond to the geospatial location of the field, wherein the one or more user inputs at least partially include data obtained during an in-season timeframe;
  generating an in-season crop model by applying the stored one or more user inputs to the crop model via the moving of the crop graphical user interface element to the mapped location on the crop modeling graphical user interface, wherein the in-season crop model includes one or more forecasted water application rates for the geospatial location of the field;
  storing the in-season crop model as a list of one or more updates made to the in-season crop model, wherein a history of the one or more updates is retrievable via an access point; and
  generating one or more control signals based on the in-season crop model, wherein the one or more control signals are configured to adjust one or more components of the irrigation system.

11. The method of claim 10, wherein the one or more user inputs include data for one or more of a crop growth stage or a crop growth development, a rate of water use, a root depth, a set of real time weather data, an irrigation event, or a set of moisture probe data.

12. The method of claim 11, wherein the data for the crop growth development includes data for one or more of a vegetation stage or a reproductive stage of a crop at the geospatial location of the field.

13. The method of claim 11, wherein the set of real time weather data includes data for one or more of a precipitation event, an evapotranspiration event, or a growing degree day.

14. The method of claim 11, wherein the data for the irrigation event includes data for one or more of a manually-entered irrigation event or an automated machine log.

15. The method of claim 11, wherein the set of moisture probe data includes data for one or more of an original set point and an updated set point, a soil daily change, a real-time available water capacity, or a depth of root zone.

16. The method of claim 11, wherein the in-season crop model is a component of a virtual optimizer irrigation model,
  wherein the virtual optimizer irrigation model receives data from one or more of at least one database, at least one electrical circuit, or at least one module,
  wherein the at least one module includes one or more of a crop database module, a crop growth model module, a weather data module, an irrigation data module, a water balance module, a moisture probe module, a set point sub-module for the moisture probe module, an available water capacity sub-module for the moisture probe module, or a root zone depth sub-module for the moisture probe module.

17. A crop modeling system comprising:
  a plurality of irrigation systems; and
  a plurality of user input devices,
  wherein the plurality of irrigation systems and the plurality of user input devices are configured to communicate with a processor and a non-transitory memory with one or more executable instructions stored thereon, wherein the processor is configured to execute the one or more executable instructions, wherein the one or more executable instructions are configured to cause the processor to:
    move a selected irrigation system graphical user interface element of a plurality of irrigation system graphical user interface elements to a mapped location on an irrigation system graphical user interface, wherein the selected irrigation system graphical user interface element corresponds to a selected irrigation system of the plurality of irrigation systems;
    open a crop modeling graphical user interface for a geospatial location of a field following the moving of the selected irrigation system graphical user interface element to the mapped location of the irrigation system graphical user interface, wherein the crop modeling graphical user interface includes a crop model for the geospatial location of the field;
    generate an in-season crop model by applying one or more user inputs to the crop model, wherein the one or more user inputs correspond to a growth stage of a type of crop at the geospatial location of the field, wherein the in-season crop model includes one or more forecasted water application rates for the geospatial location of the field;
    store the in-season crop model as a list of one or more updates made to the in-season crop model, wherein a history of the one or more updates is retrievable via an access point; and
    generate one or more control signals based on the in-season crop model, wherein the one or more control signals are configured to adjust one or more components of the selected irrigation system.

18. The system of claim 17, wherein the crop model is a preseason crop model, wherein the preseason crop model is customizable during a preseason based on at least a subset of data including weather history for ten years.

19. The system of claim 17, further comprising: generating the one or more access points for at least one of an update, customization, or optimization of the growth stage of the type of crop in the in-season crop model.

20. The system of claim 17, wherein the one or more executable instructions are further configured to cause the system processor to:

generate the in-season crop model for the selected irrigation system of the plurality of irrigation systems independently from generating an in-season crop model for an additional irrigation system of the plurality of irrigation systems.

\* \* \* \* \*